(12) United States Patent
Shah

(10) Patent No.: US 8,893,125 B2
(45) Date of Patent: Nov. 18, 2014

(54) NETWORK PORT PROFILE DEPLOYMENT IN A PRE-PROVISIONED OR DYNAMICALLY PROVISIONED NETWORK INFRASTRUCTURE

(75) Inventor: Hemal Shah, Trabuco Canyon, CA (US)

(73) Assignee: Broadcom Corporation, Irvine, CA (US)

( * ) Notice: Subject to any disclaimer, the term of this patent is extended or adjusted under 35 U.S.C. 154(b) by 169 days.

(21) Appl. No.: 13/324,668

(22) Filed: Dec. 13, 2011

(65) Prior Publication Data

US 2013/0132952 A1     May 23, 2013

Related U.S. Application Data

(60) Provisional application No. 61/561,673, filed on Nov. 18, 2011.

(51) Int. Cl.

| | | |
|---|---|---|
| G06F 9/455 | (2006.01) | |
| G06F 9/46 | (2006.01) | |
| G06F 15/16 | (2006.01) | |
| G06F 15/177 | (2006.01) | |
| G06F 15/173 | (2006.01) | |
| G06F 13/00 | (2006.01) | |
| G06F 21/53 | (2013.01) | |
| G06F 11/30 | (2006.01) | |
| H04L 12/46 | (2006.01) | |
| H04L 29/06 | (2006.01) | |

(52) U.S. Cl.
CPC .. *H04L 12/4641* (2013.01); *G06F 2009/45595* (2013.01); *G06F 9/45558* (2013.01); *G06F 21/53* (2013.01); *G06F 11/3006* (2013.01); *H04L 63/00* (2013.01)
USPC ............... 718/1; 718/104; 709/227; 709/220; 709/221; 709/222; 709/223; 710/104

(58) Field of Classification Search
None
See application file for complete search history.

(56) References Cited

U.S. PATENT DOCUMENTS

| | | |
|---|---|---|
| 2004/0267866 A1 | 12/2004 | Carollo et al. |
| 2009/0157882 A1* | 6/2009 | Kashyap ..................... 709/227 |
| 2009/0241113 A1 | 9/2009 | Seguin et al. |
| 2010/0014526 A1 | 1/2010 | Chavan et al. |
| 2010/0232443 A1 | 9/2010 | Pandey |
| 2011/0022695 A1 | 1/2011 | Dalal et al. |
| 2011/0090915 A1 | 4/2011 | Droux et al. |
| 2011/0113136 A1 | 5/2011 | Phaal |
| 2011/0283278 A1 | 11/2011 | Murrell et al. |

FOREIGN PATENT DOCUMENTS

CN     101980490 A     2/2011

OTHER PUBLICATIONS

European Search Report for corresponding European patent application No. EP 12007350.7, 3pgs., dated Feb. 14, 2013.

\* cited by examiner

*Primary Examiner* — Meng An
*Assistant Examiner* — Bing Zhao
(74) *Attorney, Agent, or Firm* — Brinks Gilson & Lione

(57) ABSTRACT

A system for an open virtualization format includes a virtualization platform to run a virtual machine and a network infrastructure to accommodate the virtualization platform. The network infrastructure includes a deployed network port profile associated with the virtual machine.

20 Claims, 4 Drawing Sheets

NETWORK PORT PROFILE DEPLOYMENT IN A PRE-PROVISIONED OR DYNAMICALLY PROVISIONED NETWORK INFRASTRUCTURE

CROSS REFERENCE TO RELATED APPLICATION

The present application claims the benefit of U.S. Provisional Application No. 61/561,673, filed Nov. 18, 2011, which is incorporated by reference herein.

TECHNICAL FIELD

This disclosure relates to an open virtualization format, and more particularly to a network port profile deployment in an open virtualization format package.

BACKGROUND

Virtual networking enables virtual computer systems, also known as virtual machines, to be networked together. Virtual computer systems can connect to each other and to the physical network using virtual Ethernet ports and virtual Ethernet switches. The open virtualization format (OVF) is a standard for packaging and distributing virtual appliances or software to be run in virtual machines.

BRIEF DESCRIPTION OF THE DRAWINGS

The system may be better understood with reference to the following drawings and description. In the figures, like reference numerals can designate corresponding parts throughout the different views.

DETAILED DESCRIPTION

The discussion below makes reference to mechanisms to deploy network profiles, also known as network port profiles, in a pre-provisioned network infrastructure and/or an association driven dynamically provisioned network infrastructure. In some instances, a complexity and/or cost of virtual networking components may be reduced by managing the virtual networking.

Figure 1:
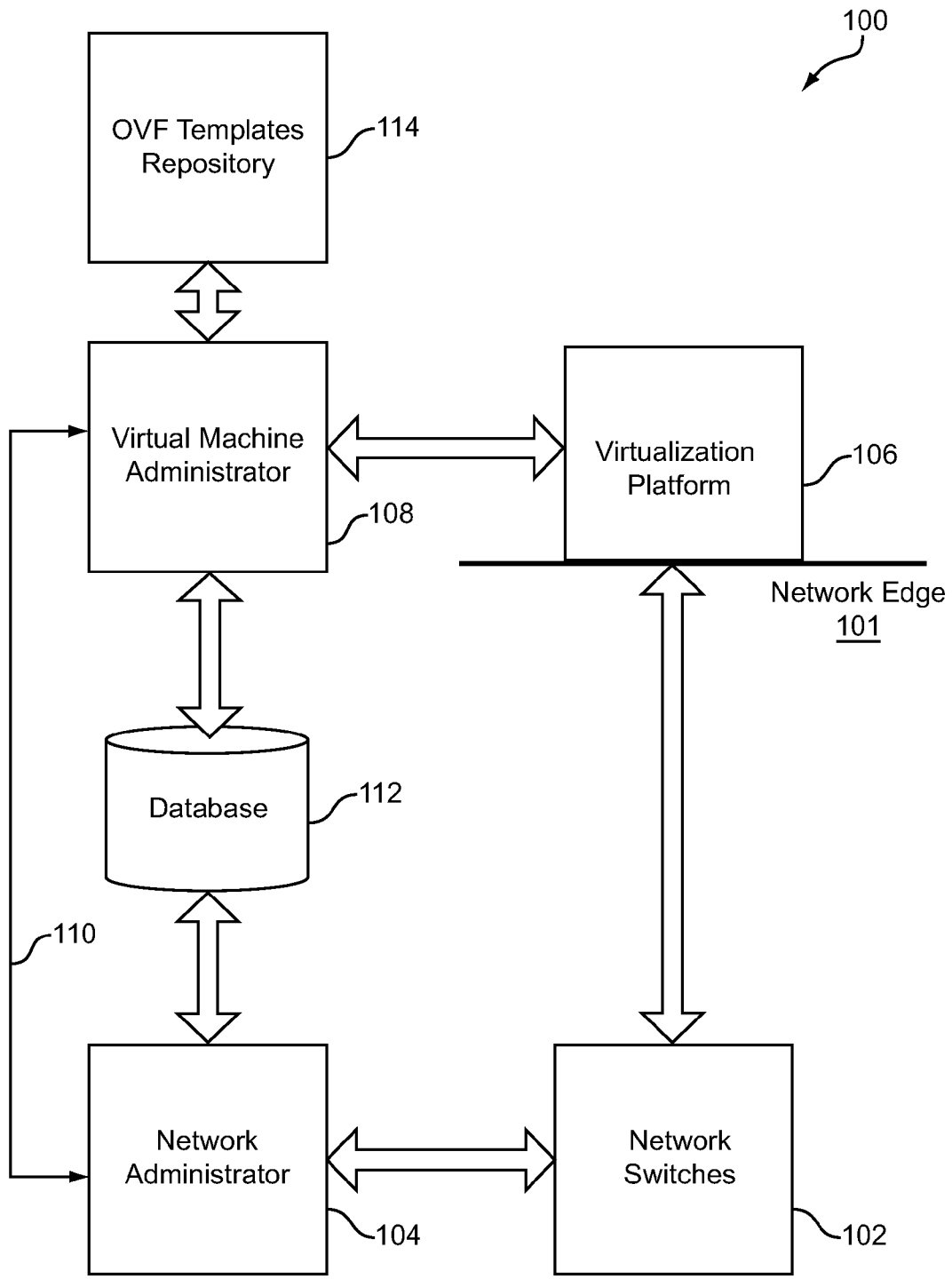
FIG. 1 is a block diagram of an exemplary network for running virtual machines.

FIG. 1 is a block diagram of an exemplary open virtualization format (OVF) environment 100 for running virtual machines. The OVF environment 100 can include a communications network 101, including network switches and controllers 102 administered by a network administrator 104. The network administrator 104 can include hardware, software and/or firmware to manage and monitor the network switches 102. The network switches 102 connect with a virtualization platform 106.

The virtualization platform 106 can be configured to deploy the virtual machines by a virtual machine administrator 108, which can be implemented together or separately from the network administrator 104, and can be implemented with software, hardware and/or firmware. If the virtual machine administrator 108 and the network administrator 104 are implemented separately, they can communicate with each other via communication line 110. Both the virtual machine administrator 108 and network administrator 104 can connect with a database 112 to store the network port profiles. The network port profiles are associated with the virtual machines, so as to ensure that the communications network 101 and virtualization platform 106 accommodate any requirements for running the virtual machines. The virtual machine administrator 108 can connect with an OVF package repository 114 for storing OVF templates for developing, packaging and distributing OVF packages. The OVF packages can include representations of virtual servers that contain configured, tested operating systems and middleware and software applications, along with the metadata that describes the virtual servers. The OVF package can include different formats such as a set of files called set-of-file format or a single TAR (tape archive) file containing the same set of files, typically with a .ova extension.

OVF can include a packaging format that provides an ease of portability, security and transportation to enable independent software vendors (ISVs) to develop virtual appliances and deploy them on a wide variety of platforms. The virtual appliances can include pre-configured software stacks of one or more virtual machines (VM's). An OVF package may contain a single virtual machine with corresponding metadata to serve as a template to deploy virtual machines for different user groups, such as different groups within an organization. Additionally or alternatively, the OVF package can contain multiple virtual machines representing a more complex application. The OVF packages can contain metadata, information about what tasks to perform with the virtual machines, how to deploy the virtual machines and how to network the virtual machines together. Other information in the OVF package may include the storage format and the virtual machine image format, such as a virtual machine disk (VDMK) or virtual hard drive (VHD), for a specific vendor, e.g., VMware, Citrix and Microsoft Hyper-V. After the OVF packages are developed, packaged, and distributed, they can be deployed by the virtual machine administrator 108 to the virtualization platform 106 and then sent to a server or any hardware platform of network switches 102.

The OVF packages provide a format which allows for packaging, distributing and deploying virtual machines with a variety of hardware and operating systems without having to determine a specific vendor of the underlying hardware and operating systems. The format can include a file with a number files contained therein that allow all the content in the files and metadata to be interpreted. At least some of the files can include network port profile content, e.g., information about the network and network components, which allow the OVF to be deployed and consistently configured at both the virtualization platform 106 and the network switches 102.

The network port profile can refer to a set of networking attributes that can be applied to one or more virtual machines. The application of network port profile to a virtual machine can result in a specific configuration of the network infrastructure to which the virtual machine connects. The network port profiles can be used to represent networking attributes such as: Quality of Service (QoS), Media access control (MAC) Addresses, Virtual Local Area Network (VLAN) tags, MAC address/VLAN pairs, Traffic Priority, Flow Control, Bandwidth settings, packet filtering and Access Control Lists (ACLs). For example, to describe two virtual machines, such as a web server and storage server, for each the VLAN numbers and minimum bandwidth setting, e.g. 2 Gigabits per seconds, can be identified by the network port profiles.

The OVF package can contain a descriptor and additional content such as one or more virtual disks or images in other formats such as an International Organization for Standardization (ISO) image or other archive file also known as a disk image 260 for optical disks. The content can accompany the OVF descriptor file or can be external to it and referred to via hypertext transfer protocol (HTTP). The OVF descriptor can be an eXtensible Markup Language (XML), or other network based language, document that can describe the meta-data about the software installed on the virtual disks. The OVF descriptor can contain commonly needed meta-data organized into sections such as virtual hardware, disks, networks, resource requirements and customization parameters.

To provide runtime customizability, the OVF package can also provide an OVF environment document specification. The environment document can allow for a standard and extensible way for a virtualization platform to communicate deployment configuration to the guest software for runtime customization, if necessary. The OVF environment can be included in an XML document containing deployment time customization information for the guest software such as MAC addresses, BIOS UUIDs, IP addresses, etc.

Figure 2:
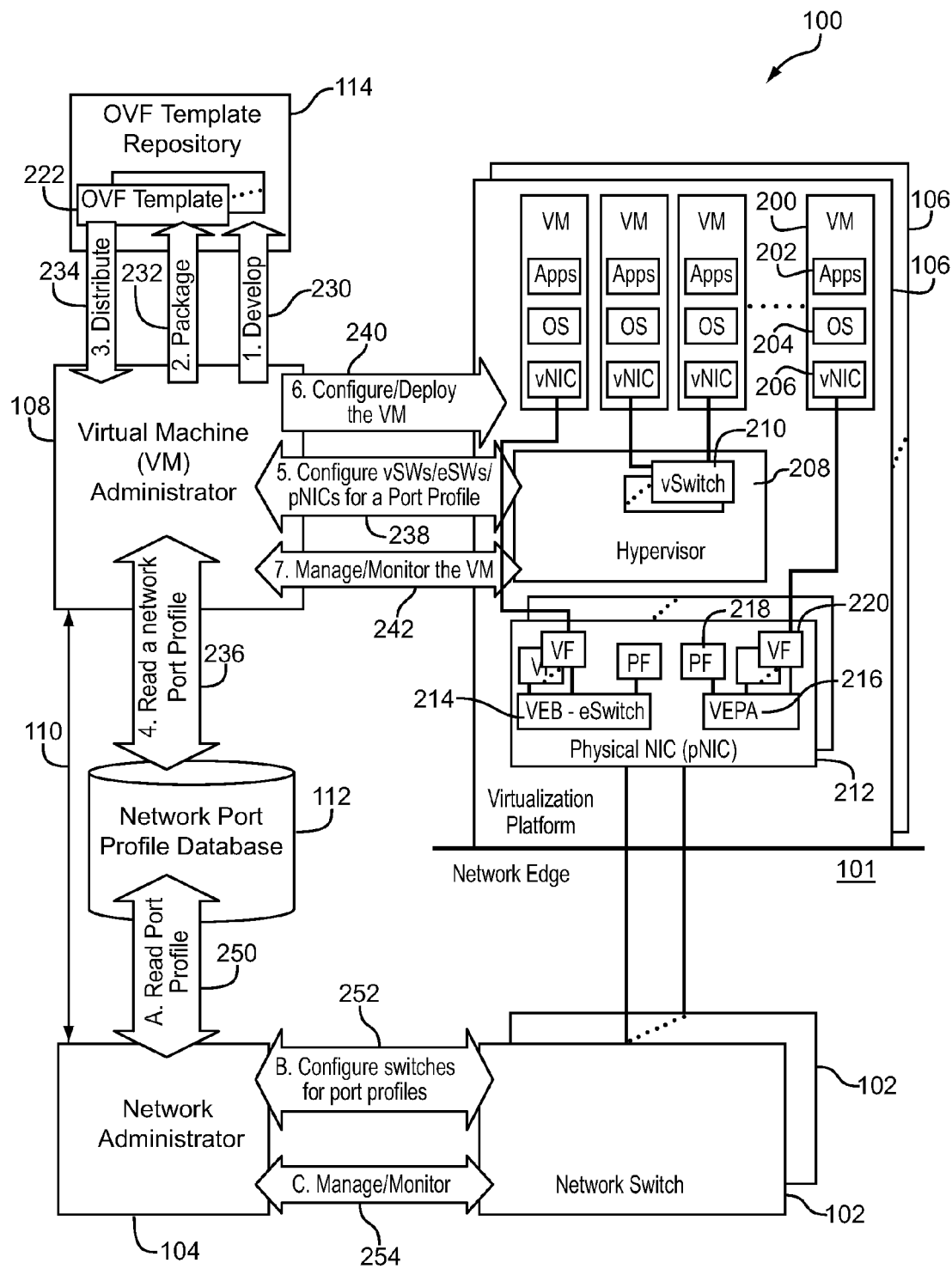
FIG. 2 is a block diagram of an exemplary OVF environment for running virtual machines with a pre-provisioned network infrastructure.

FIG. 2 is a block diagram of an exemplary OVF environment 100 for running virtual machines 200 with a pre-provisioned network infrastructure. The virtualization platform 106 can include the virtual machines 200, and the virtual machines can include applications 202, operating systems 204 and virtual network interface cards (vNIC) 206. A hypervisor 208 can connect with vNIC 206 and include virtual switches 210. Hardware component physical network interface cards (pNIC) 212 can connect with the hypervisor 208 and provide for virtual embedded bridge (VEB)—eSwitch 214 and virtual Ethernet port aggregator (VEPA) 216 (e.g., MAC embedded switches), such as provided by the Institute of Electrical and Electronics Engineers (IEEE) standard 802.1Qbg. The VEB 214 or VEPA 216 can interface with the vNIC 206 via a VF driver 220 and with the hypervisor 208 via a PF driver 218. The pNIC can interface with the network switches 102, such as physical network switches manufactured by CISCO. In this way, the virtual machines 200 can connect with the network switches 102 via vNIC 206, the hypervisor 208 and pNIC 212.

The virtual machine administrator 108 can be responsible for provisioning all the network components on the virtualization platform 106 and the network administrator 104 can be responsible for provisioning all the network components on the network switches 102. The virtual machine administrator 108 and the network administrator 104 can be implemented separately or together, such as with the same device. If implemented separately, the virtual machine administrator 108 and network administrator 104 can share information about their respective provisioning information via communication line 110. Therefore, virtual machines 200 can be deployed across multiple systems and a physical network infrastructure, e.g. virtual platform 106 and network switches 102, with the required services from the network, such as described in the in the network port profile.

With pre-provisioning, the network administrator 104 can pre-provision an infrastructure of the network 101 before the virtual machines 200 are deployed by the virtual machine administrator 108. Therefore, before virtual machine deployment, the network administrator 108 can determine that at some point in time the virtualization platform 106 connected to the physical infrastructure of the network 101 will be running virtual machines 200 requiring services on the network 101. At 250, the network administrator 104 can read network port profiles from the network port profile database 112. At 252, the network administrator 104 can communicate the network port profiles with the physical infrastructure of the network 101, e.g., network switches 102, and can configure the network 101 to enable support of the network port profile services required when the virtual machines 200 are deployed. At 254, the network administrator can manage and monitor the services on the network 101.

Therefore, in this example the network infrastructure is pre-provisioned with the network port profiles. The network switches 102 or adjacent switches need not access network the port profile database 112 during deployment of the virtual machines 200. The virtual administrator 108, who is responsible for the OVF packaging 232 and virtual machine deployment 240 and management 242, has access to the network port profile contents. The network port profile content need not be contained in the OVF package and the virtual administrator 108 can access the network port profile database 112 to apply network port profiles to virtual networking components on the virtualization platform 106 during the virtual machine deployment at 240.

In one example, to apply the network port profiles to the virtual networking components, at 230 the virtual machine administrator 108 develops an OVF package. In general with OVF, content of OVF packages can be developed 230 and packaged 232 to create on OVF package. Then the OVF packages can be distributed 234 and deployed 240. Deployment 240 can include interpreting the contents of the OVF package and deploying the content accordingly. At 232, the elements the of the OVF package may be packaged, such as based on OVF templates 222 stored in the OVF template repository 114. At 234, the OVF package can be distributed to the virtual machine administrator 108. Upon distributing the OVF package, the virtual machine administrator 108 can read content from the OVF package and at 236 can read the network port profile from the network port profile database 112, which will be deployed. At 238, the virtual machine administrator 108 can configure, based on the contents of network port profile for one or more virtual machines 200, e.g., according to the OVF package, across one or more virtualization platforms 106, the components of the virtualization platforms 106, e.g., vSwitch 210, VEB 214, vNIC 206 and pNIC 212. The network port profile contents can be embedded in the description of one or more virtual machines inside the OVF file.

At 240, after configuration of the virtualization platform 106 the virtual machines 200 can be configured and deployed to the virtualization platform 106. Since the virtualization platform 106 and network 101 were pre-configured, the moment the virtual machines 200 are deployed they can start executing and obtain the services of the network 101 that are described or requested by the OVF package for the OVF. During deployment all the networking components on the virtualization platform 106 and adjacent switches, e.g., vNIC 206 to vSwitch210, vNIC 206 to VEB 214, vNIC 206 to VEPA 216, and pNIC 212 to network switches 102 can utilize the resource provisioning information based on different networking attributes, such as ones provided in the network port profile. For example, the network port profile may require at least 2 Gigabits per second bandwidth be available to operate the virtual machines 200. Therefore, when virtual machines 200 are executing or running in the OVF environment 100, the virtual machines 200 can receive from components along the path, e.g., the vNIC 206, the vSwitch 210, the pNIC 212 and the network switches 102, the 2 Gigabits per second service that is described in the network port profile. At 242, the virtual machine administrator 108 can manage and monitor the virtual machines 200.

Figure 3:
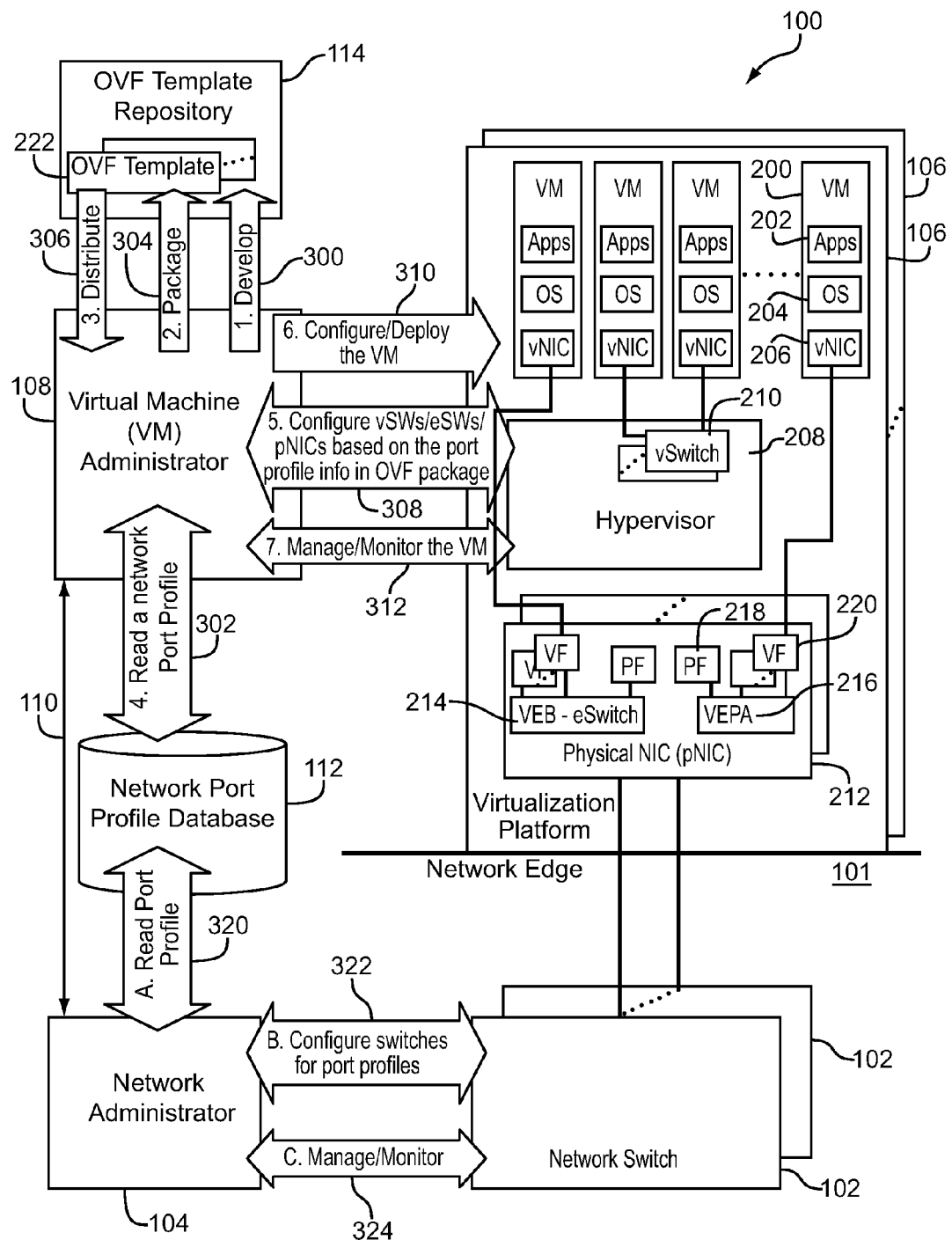
FIG. 3 is a block diagram of an exemplary OVF environment for running virtual machines with a pre-provisioned network infrastructure.

FIG. 3 is a block diagram of an exemplary OVF environment 100 for running virtual machines 200 with a pre-provisioned network infrastructure. In this example, the virtual machine administrator 108 can read port profile content. e.g., from the network port profile database 112, between development 300 and packaging 304 of the OVF package. Therefore, the virtual machine administrator 108 can develop 300 an OVF package, read a network port profile 302 and package the contents 304 including the network port profile. The OVF package is then distributed 306 to the virtual machine administrator 108. At 308, the vSwitch 210, VEB 214, VEPA 216, vNIC 206 and pNIC 212 can be configured based on the port profile content located in the OVF package. At 310, the virtual machines 200 can be configured and deployed. At 312, the virtual machine administrator 108 can manage and monitor the virtual machines 200. In the physical network 101, the network administrator 104 can read the port profiles 320, configure switches for the port profiles 322, and manage and monitor the configurations 324.

In this example, the network port profile content can be changed until the OVF package is packaged. In the example of FIG. 2, the network port profiles can be changed after the OVF package is packaged, up to deployment (steps 5 and 6) of the virtual machines on the networks 101, 106, since provisioning of the network 101 and virtualization platform 106 need not depend on content in the OVF package. Other examples are possible, such as by relying on the port profile in the OVF package and external to the OVF package to configure the networks 101, 106.

In FIG. 3, the network infrastructure can be pre-provisioned with the network port profiles, and the network switches or adjacent switches need not access network port profile database during the virtual machine deployment. The virtual machine administrator 108, which can be responsible for the OVF packaging and virtual machine 200 deployment/management, determines the network port profile schema and contents when packaging the OVF package. The network port profile content is then contained in the OVF package to allow the virtual machine administrator 108 to apply network port profile to virtual networking components on the virtualization platform during the virtual machine deployment time. The virtual machine administrator need not access the network port profile database 112 during the virtual machine deployment to apply the network port profiles to the virtual networking components, e.g. those of the virtualization platform 106.

This example can enable the deployment of network port profiles on both the network infrastructure 101 and virtualization platform 212 using a common format where the network infrastructure 101 has been pre-provisioned with the network port profiles. The example enables static provisioning of network port profiles. The example can eliminate dynamic association of virtual machines with the network infrastructure 101 prior to the deployment of network port profiles and virtual machines on the virtualization platform 106.

Figure 4:
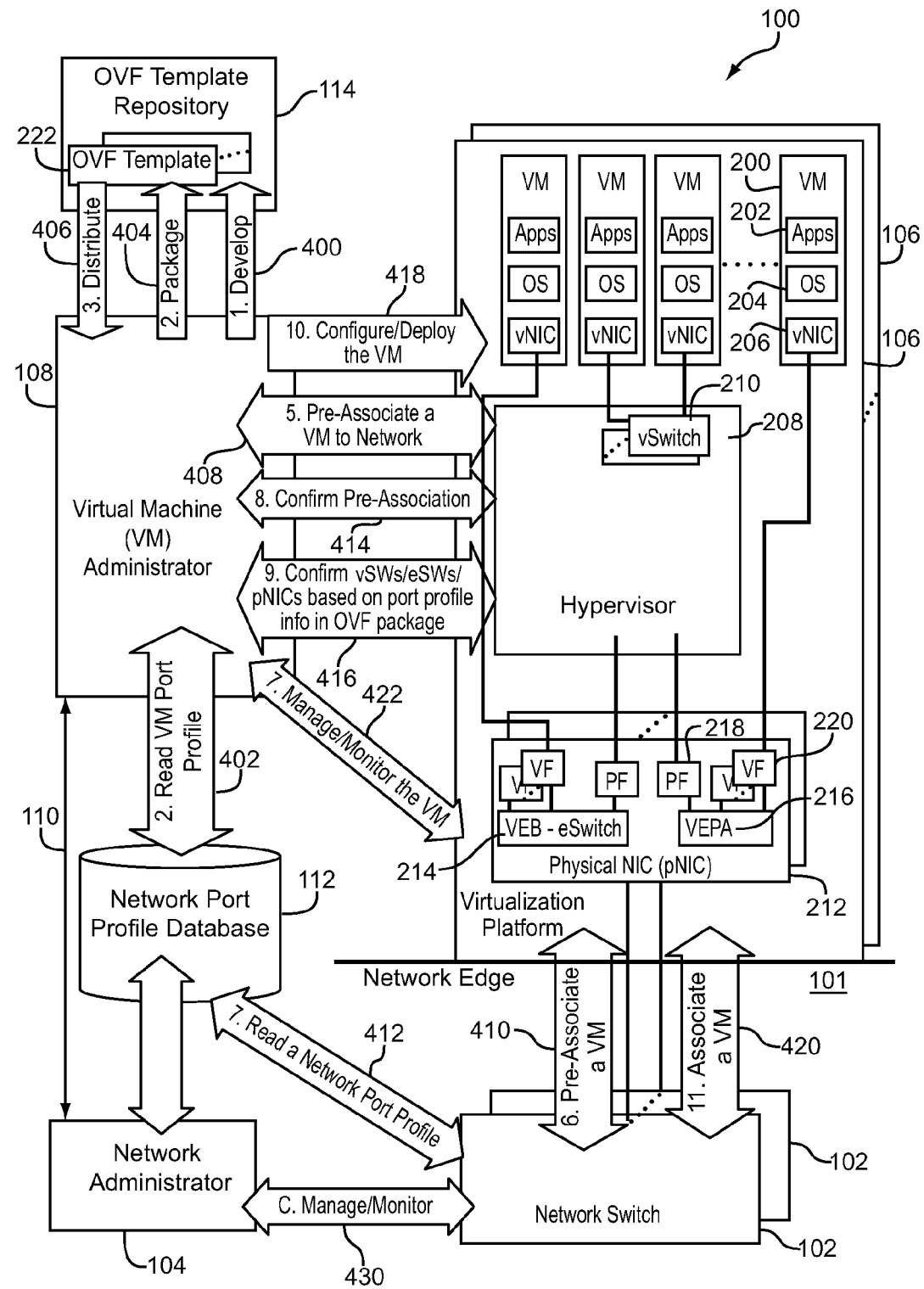
FIG. 4 is a block diagram of an exemplary OVF environment for running virtual machines with a dynamically provisioned network infrastructure.

FIG. 4 is a block diagram of an exemplary OVF environment 100 for running virtual machines 200 with a dynamically provisioned network infrastructure. In this example, there can be dynamic deployment of network port profiles on the virtualization platform 106 that may or may not be connected to a pre-provisioned network infrastructure 101. Prior to configuring the network components 101, 106 the virtual machine administrator 108 can trigger an association with the network 101 via the virtualization platform 106. During virtual machine run time, or during virtual machine deployment time, the virtual machine administrator 108 can deploy the virtual machines 200 and configure the components on the networks 101, 106. The virtual machine administrator 108 can develop an OVF package 400, read virtual machine port profiles 402, package the OVF package 404 and distribute the OVF package 406.

In this example, the network port profile content can be changed until the OVF package is packaged. In the example of FIG. 2, the network port profiles can be changed after the OVF package is packaged, up to deployment (steps 5 and 6) of the virtual machines on the networks 101, 106, since provisioning of the network 101 and virtualization platform 106 need not depend on content in the OVF package. Other examples are possible, such as by relying on the port profile in the OVF package and external to the OVF package to configure the networks 101, 106.

Once they have been pre-associated, the underlying network infrastructure is provisioned for the virtual machine administrator 108 to deploy virtual machines 200. At 416, the virtual machine administrator 108 can configure vSwitch 210, VEB 214, VEPA 216, vNIC 206 and pNIC 212, etc., based on the network port profile content in the OVF package. At 418, the virtual machine administrator 108 can configure and deploy the virtual machines 200. As part of the deployment, at 420 the virtual machine is associated with the network infrastructure, and the physical network infrastructure determines that the virtual machine 200 has been deployed and is running. At 422, the virtualization machine administrator 108 can manage and monitor the virtualization platform 106, for example, monitor all the virtual machines 200 that are deployed, the components of virtualization, such as the hypervisor 208, the pNIC 212 and the virtual machines 200, and change resource allocation as needed. At 430, the network administrator 104 can manage and monitor the network switches 102 to ensure that the network port profile requirements are being met for the virtual machines 102.

In this example, the network infrastructure need not be pre-provisioned with the network port profiles before virtual machines 200 are deployed. The network switches or adjacent switches can access network port profile database during the virtual machine deployment. The virtual machine administrator 108, which is responsible for the OVF packaging and virtual machine deployment/management, accesses the network port profile schema and contents. The network port profile content can be contained in the OVF package to allow the virtual machine administrator 108 to apply network port profile to virtual networking components on the virtualization platform 106 during the virtual machine deployment time. The virtual machine administrator 108 need not access the network port profile database during the virtual machine deployment. The association of the virtual machines with the network infrastructure can result in dynamic provisioning and deployment of network port profiles in the network infrastructure. FIG. 4 illustrates steps which can be involved in applying the network port profiles to the virtual networking components.

Some benefits of dynamic deployment include enabled deployment of network port profiles in both the network infrastructure and virtualization infrastructure using a common format. In addition, deployment of network port profiles can be implemented without pre-provisioning the network infrastructure. This enables the virtual machines to dynamically associate with the network infrastructure and allow the network infrastructure to access network port profiles during runtime and virtual machine deployment time.

The methods, devices, and logic described above may be implemented in many different ways in many different combinations of hardware, software or both hardware and software. For example, all or parts of the system may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. All or part of the logic described above may be implemented as instructions for execution by a processor, controller, or other processing device and may be stored in a tangible or non-transitory machine-readable or computer-readable medium such as flash memory, random access memory (RAM) or read only memory (ROM), erasable programmable read only memory (EPROM) or other machine-readable medium such as a compact disc read only memory (CDROM), or magnetic or optical disk. Thus, a product, such as a computer program product, may include a storage medium and computer readable instructions stored on the medium, which when executed in an endpoint, computer system, or other device, cause the device to perform operations according to any of the description above.

The processing capability of the system may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs may be parts (e.g., subroutines) of a single program, separate programs, distributed across several memories and processors, or implemented in many different ways, such as in a library, such as a shared library (e.g., a dynamic link library (DLL)). The DLL, for example, may store code that performs any of the system processing described above.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A system, comprising:
   a virtualization platform configured to support a virtual network and a first virtual machine;
   physical network configuration circuitry, in data communication with a physical network switch, the physical network configuration circuitry configured to:
      when triggered by provisioning information, access a network port profile stored in a database, network port profile comprising a packet processing attribute characterizing operation of the first virtual machine; and
      configure a first port on the physical network switch responsive to the network port profile to support implementation of the packet processing attribute for the first virtual machine; and
   virtual administrator circuitry in data communication with the virtualization platform, the virtual administrator circuitry communicatively coupled to the physical network configuration circuitry and configured to:
      access the network port profile stored in the database;
      responsive to the network port profile, configure a second port on the first virtual machine to support implementation of the packet processing attribute
      send the provisioning information to the physical network configuration circuitry, to trigger the physical network configuration circuitry to access the network port profile; and
      deploy the first virtual machine in the virtual network with network connectivity through the physical network switch.

2. The system of claim 1, wherein the physical network configuration circuitry is configured to configure the first port prior to deployment of the first virtual machine by the virtual administrator circuitry.

3. The system of claim 1, wherein the physical network configuration circuitry is configured to access the network port profile responsive to deployment of the first virtual machine by the virtual administrator circuitry.

4. The system of claim 1, wherein the network port profile is stored in the database in a common format understood by the virtual administrator circuitry and the physical network configuration circuitry.

5. The system of claim 1, wherein the physical network configuration circuitry is configured to monitor the physical network switch to ensure continuing compliance with the configuration of the first port after deployment of the first virtual machine.

6. The system of claim 1, wherein the virtual administrator circuitry is further configured to configure a virtual switch responsive to the network port profile.

7. The system of claim 1, wherein the virtual administrator is configured to deploy a second virtual machine configured responsive to the network port profile.

8. The system of claim 1, where the packet processing attribute comprises, quality of service, media access control (MAC) addresses, virtual local area network (VLAN) tagging, MAC address/VLAN pairs, traffic priority, flow control, bandwidth settings, packet filtering, access control lists, or any combination of the above.

9. A method, comprising:
   by virtual administrator circuitry:
      determining to deploy a virtual machine in a virtual network;
      accessing a database to read a network port profile;
      configuring a first port of the virtual machine based on a packet processing attribute in the network port profile; and
      sending provisioning information to physical network configuration circuitry in communication with the virtual administrator circuitry, the provisioning information comprising an indication of the network port profile, the provisioning information configured to trigger access of the network port profile by the physical network configuration circuitry; and
      deploying the virtual machine in the virtual network; and
   by the physical network configuration circuitry:
      when triggered by the provisioning information, accessing the database to read the network port profile; and
      configuring a second port of a physical network switch responsive the packet processing attribute in the network port profile to support association with the first port of the virtual machine.

10. The method of claim 9 further comprising monitoring, by the physical network configuration circuitry, the physical network switch after deployment of the virtual machine.

11. The method of claim 9 wherein configuring the second port comprises configuring the second port after deployment of the virtual machine.

12. The method of claim 9, wherein configuring the second port comprises configuring the second port prior to deployment of the virtual machine.

13. The method of claim 9, wherein accessing a database to read a network port profile, by the physical network configuration circuitry, comprises accessing the network port profile in a format readable by the virtual administrator circuitry.

14. The method of claim 9, wherein the packet processing attribute comprises, quality of service, media access control (MAC) addresses, virtual local area network (VLAN) tagging, MAC address/VLAN pairs, traffic priority, flow control, bandwidth settings, packet filtering, access control lists, or any combination of the above.

15. The method of claim 9, further comprising deploying, by the virtual administrator circuitry, another virtual machine configured based on the network port profile.

16. A product, comprising: a computer-readable medium other than a transitory signal; instructions stored on the medium, the instructions configured to, when executed:
  receive, at physical network configuration circuitry in communication with virtual administrator circuitry, provisioning information from virtual administrator circuitry configured to deploy a virtual machine;
  when triggered by the provisioning information, access a database to read the network port profile, the network port profile comprising a packet processing attribute characterizing operation of the virtual machine; and
  configure a second port of a physical network switch responsive the network port profile to support implementation of the packet processing attribute for the virtual machine;
  wherein the provisioning information comprises:
  an indicator of a first port of the virtual machine configured based on a network port profile stored in the database; and
  an indicator of the packet processing attribute characterizing operation of the virtual machine; and
  wherein the provisioning information is configured to trigger access of the database by the physical network configuration circuitry.

17. The product of claim 16, wherein the instructions are further configured to configure the second port prior to deployment of the virtual machine.

18. The product of claim 16, wherein the instructions are further configured to monitor the physical network switch after deployment of the virtual machine to ensure compliance with the network port profile.

19. The product of claim 16, wherein the instructions are further configured to configure the second port after deployment of the virtual machine.

20. The product of claim 16, wherein the instructions are further configured to read the network port profile in a format readable by the virtual administrator circuitry.

* * * * *